(12) United States Patent
Anderson et al.

(10) Patent No.: US 9,829,766 B2
(45) Date of Patent: Nov. 28, 2017

(54) ELECTRO-OPTIC BEAM DEFLECTOR DEVICE

(71) Applicant: Analog Devices, Inc., Norwood, MA (US)

(72) Inventors: Michael H. Anderson, Lyons, CO (US); Scott R. Davis, Denver, CO (US); Scott D. Rommel, Lakewood, CO (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 15/428,432

(22) Filed: Feb. 9, 2017

(65) Prior Publication Data

US 2017/0153530 A1    Jun. 1, 2017

Related U.S. Application Data

(60) Continuation of application No. 15/360,752, filed on Nov. 23, 2016, which is a continuation of application (Continued)

(51) Int. Cl.
  *G02F 1/295* (2006.01)
  *G02F 1/29* (2006.01)

(52) U.S. Cl.
  CPC ........ *G02F 1/295* (2013.01); *G02F 2001/291* (2013.01); *G02F 2201/06* (2013.01); *G02F 2201/122* (2013.01)

(58) Field of Classification Search
  CPC ...... G02F 1/29; G02F 1/295; G02F 2001/291; G02F 2201/06; G02F 2201/122
  See application file for complete search history.

(56) References Cited

U.S. PATENT DOCUMENTS 3,506,779 A * 4/1970 Hempstead ............ B23K 26/08
  101/150
3,912,362 A   10/1975 Hudson
  (Continued)

FOREIGN PATENT DOCUMENTS

| EP | 1186940 A2 | 3/2002 |
| JP | 59-52219 A | 3/1984 |
| JP | 63-244004 A | 10/1988 |

OTHER PUBLICATIONS

Liquid Crystal Waveguides: New Devices Enabled by >1000 Waves of Optical Phase Control Davis et al., Vescent Photonics Inc., Proc. of SPIE vol. 7618.*

(Continued)

*Primary Examiner* — Andrew Jordan
(74) *Attorney, Agent, or Firm* — Schwegman Lundberg & Woessner, P.A.

(57) ABSTRACT

A substantially planar waveguide for dynamically controlling the out-of-plane angle at which a light beam exits the waveguide. Generally, liquid crystal materials may be disposed within a waveguide in a cladding proximate or adjacent to a core layer of the waveguide. In one example, the waveguide may contain one or more taper regions such that the light beam exits the waveguide and propagates out-of-the-plane of the waveguide into an out-coupling medium at a propagation angle. In one example, the waveguide may contain one or more electrodes onto which one or more voltages may be applied. The magnitude of the propagation angle may be electronically controlled by stored by controlling or altering the magnitude of the one or more applied voltages.

20 Claims, 4 Drawing Sheets

Related U.S. Application Data

No. 14/832,574, filed on Aug. 21, 2015, now abandoned, which is a division of application No. 12/660,028, filed on Feb. 17, 2010, now abandoned.

(60) Provisional application No. 61/207,851, filed on Feb. 17, 2009.

(56) References Cited

U.S. PATENT DOCUMENTS

| | | | |
|---|---|---|---|
| 3,922,064 A | 11/1975 | Clark et al. | |
| 3,923,376 A * | 12/1975 | Martin | G02F 1/295 |
| | | | 385/33 |
| 3,963,310 A * | 6/1976 | Giallorenzi | G02B 6/126 |
| | | | 349/130 |
| 3,995,623 A | 12/1976 | Blake et al. | |
| 4,006,967 A * | 2/1977 | Kenan | G02F 1/292 |
| | | | 359/286 |
| 4,116,655 A | 9/1978 | Lewis | |
| 4,261,721 A | 4/1981 | Lewis | |
| 4,737,014 A * | 4/1988 | Green | G02F 1/1326 |
| | | | 385/123 |
| 4,896,325 A * | 1/1990 | Coldren | H01S 5/06256 |
| | | | 372/102 |
| 4,917,097 A | 4/1990 | Proudian et al. | |
| 5,044,712 A * | 9/1991 | Soref | G02F 1/1326 |
| | | | 349/172 |
| 5,132,079 A * | 7/1992 | Stewart | G02B 6/245 |
| | | | 385/15 |
| 5,167,233 A | 12/1992 | Eberle et al. | |
| 5,255,112 A * | 10/1993 | Hori | G02B 26/125 |
| | | | 250/235 |
| 5,291,567 A * | 3/1994 | Revelli, Jr. | G11B 7/1245 |
| | | | 385/14 |
| 5,301,201 A * | 4/1994 | Dutta | G02F 1/29 |
| | | | 372/101 |
| 5,317,446 A * | 5/1994 | Mir | G02F 1/292 |
| | | | 359/296 |
| 5,319,668 A * | 6/1994 | Luecke | H01S 5/143 |
| | | | 372/107 |
| 5,325,860 A | 7/1994 | Seward et al. | |
| 5,347,377 A * | 9/1994 | Revelli, Jr. | G02F 1/1326 |
| | | | 250/227.17 |
| 5,388,169 A * | 2/1995 | Kobayashi | G02F 1/1326 |
| | | | 349/196 |
| 5,499,256 A * | 3/1996 | Bischel | H01S 5/141 |
| | | | 372/12 |
| 5,504,772 A * | 4/1996 | Deacon | H01S 3/063 |
| | | | 372/102 |
| 5,513,196 A * | 4/1996 | Bischel | H01S 5/141 |
| | | | 372/102 |
| 5,596,671 A * | 1/1997 | Rockwell, III | G02B 6/001 |
| | | | 385/147 |
| 5,603,327 A | 2/1997 | Eberle et al. | |
| 5,766,974 A * | 6/1998 | Sardella | H01L 21/32135 |
| | | | 257/E21.31 |
| 5,789,776 A * | 8/1998 | Lancaster | H01L 27/11568 |
| | | | 257/296 |
| 5,837,613 A * | 11/1998 | Kalnitsky | H01L 21/02126 |
| | | | 216/38 |
| 5,873,835 A | 2/1999 | Hastings et al. | |
| 5,953,477 A | 9/1999 | Wach et al. | |
| 5,965,691 A * | 10/1999 | Gibbons | C08G 73/10 |
| | | | 349/123 |
| 6,041,071 A * | 3/2000 | Tayebati | G02F 1/035 |
| | | | 372/20 |
| 6,049,958 A | 4/2000 | Eberle et al. | |
| 6,078,704 A * | 6/2000 | Bischel | G02F 1/011 |
| | | | 385/10 |
| 6,078,831 A | 6/2000 | Belef et al. | |
| 6,134,003 A | 10/2000 | Tearney et al. | |
| 6,178,035 B1 * | 1/2001 | Eda | G02B 3/0012 |
| | | | 359/326 |
| 6,205,159 B1 * | 3/2001 | Sesko | H01S 5/141 |
| | | | 372/20 |
| 6,215,928 B1 * | 4/2001 | Friesem | G02F 1/025 |
| | | | 372/102 |
| 6,222,970 B1 | 4/2001 | Wach et al. | |
| 6,241,397 B1 | 6/2001 | Bao et al. | |
| 6,315,732 B1 | 11/2001 | Suorsa et al. | |
| 6,324,204 B1 * | 11/2001 | Deacon | G02B 6/12007 |
| | | | 372/20 |
| 6,330,388 B1 * | 12/2001 | Bendett | C03C 4/00 |
| | | | 385/129 |
| 6,373,872 B2 * | 4/2002 | Deacon | G02B 6/12007 |
| | | | 372/102 |
| 6,416,234 B1 | 7/2002 | Wach et al. | |
| 6,449,084 B1 * | 9/2002 | Guo | G02F 1/295 |
| | | | 359/315 |
| 6,470,036 B1 * | 10/2002 | Bailey | H01S 5/141 |
| | | | 372/102 |
| 6,480,513 B1 * | 11/2002 | Kapany | H01S 5/146 |
| | | | 372/102 |
| 6,546,163 B2 * | 4/2003 | Thackara | G02F 1/1326 |
| | | | 385/131 |
| 6,559,921 B1 * | 5/2003 | Leslie | G02F 1/1326 |
| | | | 349/196 |
| 6,594,408 B1 * | 7/2003 | Noe | H04B 10/2569 |
| | | | 385/11 |
| 6,603,902 B1 * | 8/2003 | So | G02F 1/0115 |
| | | | 359/573 |
| 6,608,952 B2 * | 8/2003 | Eggleton | G02B 6/02376 |
| | | | 385/43 |
| 6,650,822 B1 * | 11/2003 | Zhou | G02B 6/1221 |
| | | | 385/147 |
| 6,659,957 B1 | 12/2003 | Vardi et al. | |
| 6,661,936 B2 * | 12/2003 | Noe | G02F 1/0136 |
| | | | 359/489.02 |
| 6,763,047 B2 * | 7/2004 | Daiber | H01S 5/141 |
| | | | 372/20 |
| 6,768,856 B2 * | 7/2004 | Akwani | C03C 3/076 |
| | | | 385/129 |
| 6,813,417 B2 * | 11/2004 | Oh | G02B 6/1221 |
| | | | 385/141 |
| 6,816,140 B2 * | 11/2004 | Fujieda | G02F 1/1326 |
| | | | 345/205 |
| 6,816,516 B2 * | 11/2004 | Daiber | G02B 6/29395 |
| | | | 372/102 |
| 6,853,654 B2 * | 2/2005 | McDonald | G02B 5/281 |
| | | | 372/102 |
| 6,859,567 B2 * | 2/2005 | Galstian | G02F 1/0118 |
| | | | 385/1 |
| 6,859,572 B2 * | 2/2005 | Ishibashi | G02B 6/3536 |
| | | | 345/173 |
| 6,920,159 B2 * | 7/2005 | Sidorin | H01S 5/141 |
| | | | 372/102 |
| 6,938,474 B2 | 9/2005 | Melvås | |
| 6,948,859 B2 | 9/2005 | Anderson | |
| 7,079,724 B2 * | 7/2006 | Thackara | G02F 1/1326 |
| | | | 385/16 |
| 7,082,238 B2 | 7/2006 | Nishimura | |
| 7,097,620 B2 | 8/2006 | Corl et al. | |
| 7,141,815 B2 * | 11/2006 | Yankielun | G01D 5/35338 |
| | | | 250/227.11 |
| 7,146,070 B1 * | 12/2006 | Li | G02F 1/1326 |
| | | | 385/129 |
| 7,184,148 B2 | 2/2007 | Alphonse | |
| 7,190,464 B2 | 3/2007 | Alphonse | |
| 7,242,480 B2 | 7/2007 | Alphonse | |
| 7,242,832 B2 | 7/2007 | Carlin et al. | |
| 7,245,789 B2 | 7/2007 | Bates et al. | |
| 7,315,665 B1 * | 1/2008 | Anderson | G02F 1/0136 |
| | | | 349/18 |
| 7,403,678 B2 * | 7/2008 | Thapliya | G02F 1/3132 |
| | | | 385/129 |
| 7,417,740 B2 | 8/2008 | Alphonse et al. | |
| 7,447,388 B2 | 11/2008 | Bates et al. | |
| 7,570,320 B1 * | 8/2009 | Anderson | G02F 1/1326 |
| | | | 349/61 |

(56) References Cited

U.S. PATENT DOCUMENTS

| | | | |
|---|---|---|---|
| 7,599,588 B2 | 10/2009 | Eberle et al. | |
| 7,634,163 B2 | 12/2009 | Moy et al. | |
| 7,720,116 B2* | 5/2010 | Anderson | H01S 5/143 372/20 |
| 7,753,852 B2 | 7/2010 | Maschke | |
| 7,986,407 B2 | 7/2011 | Moser et al. | |
| 8,049,885 B1 | 11/2011 | Moser et al. | |
| 8,118,494 B2 | 2/2012 | Larson | |
| 8,139,212 B2 | 3/2012 | Moser et al. | |
| 8,155,489 B2* | 4/2012 | Saarikko | G02B 6/0028 362/628 |
| 8,184,285 B2 | 5/2012 | Moser et al. | |
| 8,311,372 B2* | 11/2012 | Anderson | G02F 1/295 349/21 |
| 8,320,723 B2 | 11/2012 | Eberle et al. | |
| 8,369,017 B2 | 2/2013 | Moser et al. | |
| 8,380,025 B2* | 2/2013 | Anderson | G02F 1/295 349/21 |
| 8,463,080 B1* | 6/2013 | Anderson | G02F 1/1396 385/3 |
| 8,583,218 B2 | 11/2013 | Eberle | |
| 8,860,897 B1* | 10/2014 | Anderson | G02F 1/1326 349/17 |
| 8,861,908 B2 | 10/2014 | Eberle et al. | |
| 8,923,102 B1 | 12/2014 | Shi et al. | |
| 8,989,523 B2* | 3/2015 | Anderson | G02F 1/295 385/3 |
| 8,995,038 B1* | 3/2015 | Anderson | G02B 17/023 359/227 |
| 9,088,126 B2 | 7/2015 | Zheng et al. | |
| 9,097,896 B2 | 8/2015 | Moser et al. | |
| 9,244,546 B2 | 1/2016 | Mimura et al. | |
| 9,286,920 B1 | 3/2016 | Hu et al. | |
| 9,291,776 B2 | 3/2016 | Svilans | |
| 9,366,938 B1* | 6/2016 | Anderson | G02F 1/1326 |
| 9,473,768 B2 | 10/2016 | Uyeno et al. | |
| 9,477,135 B1* | 10/2016 | Uyeno | G02F 1/295 |
| 9,533,123 B2 | 1/2017 | Eberle | |
| 9,587,983 B1 | 3/2017 | Ho et al. | |
| 9,599,565 B1 | 3/2017 | Carriere et al. | |
| 2001/0033400 A1* | 10/2001 | Sutherland | C09K 19/544 359/15 |
| 2002/0031299 A1* | 3/2002 | Hatakoshi | G02B 6/241 385/31 |
| 2002/0041412 A1* | 4/2002 | Hajjar | H04J 14/0212 398/87 |
| 2002/0041726 A1* | 4/2002 | Thackara | G02F 1/1326 385/16 |
| 2002/0059827 A1 | 5/2002 | Smith | |
| 2002/0131694 A1* | 9/2002 | So | G02F 1/0115 385/27 |
| 2002/0140879 A1* | 10/2002 | Fujieda | G02F 1/1326 349/69 |
| 2002/0150362 A1* | 10/2002 | Gutin | H04B 10/2543 385/122 |
| 2002/0154878 A1* | 10/2002 | Akwani | C03C 3/076 385/129 |
| 2002/0181880 A1* | 12/2002 | Dautartas | G02B 6/3636 385/51 |
| 2003/0048817 A1* | 3/2003 | Steffens | H01S 3/105 372/20 |
| 2003/0059148 A1* | 3/2003 | Nishizawa | G02F 1/313 385/8 |
| 2003/0086448 A1* | 5/2003 | Deacon | H01S 5/02248 372/20 |
| 2003/0103708 A1* | 6/2003 | Galstian | G02F 1/0118 385/1 |
| 2003/0108273 A1* | 6/2003 | Kowalczyk | G02F 1/0147 385/16 |
| 2003/0137999 A1* | 7/2003 | Spiegelberg | H01S 3/063 372/6 |
| 2003/0142262 A1* | 7/2003 | Leslie | G02F 1/1326 349/198 |
| 2003/0169958 A1* | 9/2003 | Ridgway | G02F 1/065 385/14 |
| 2003/0214059 A1* | 11/2003 | Itoh | B29B 13/023 264/1.1 |
| 2003/0214700 A1* | 11/2003 | Sidorin | H01S 5/146 359/334 |
| 2003/0219197 A1* | 11/2003 | Kawamoto | G02F 1/1326 385/22 |
| 2003/0231279 A1* | 12/2003 | Wessel | G02F 1/1326 349/198 |
| 2004/0057475 A1* | 3/2004 | Frankel | H01S 3/2383 372/25 |
| 2004/0067000 A1 | 4/2004 | Bates et al. | |
| 2004/0067013 A1* | 4/2004 | Gu | G02F 1/292 385/31 |
| 2004/0129949 A1* | 7/2004 | Deliwala | B82Y 20/00 257/194 |
| 2004/0150329 A1* | 8/2004 | Asai | H01L 51/5275 313/506 |
| 2004/0158028 A1* | 8/2004 | Buhler | C08G 69/265 528/331 |
| 2004/0169132 A1* | 9/2004 | Yankielun | G01D 5/35338 250/227.24 |
| 2004/0208412 A1* | 10/2004 | Miyazaki | G02F 1/295 385/9 |
| 2004/0264902 A1* | 12/2004 | Zoorob | B82Y 20/00 385/129 |
| 2005/0047739 A1* | 3/2005 | Parker | G02F 1/353 385/122 |
| 2005/0121734 A1 | 6/2005 | Degertekin et al. | |
| 2005/0123228 A1* | 6/2005 | Nishizawa | G02F 1/295 385/4 |
| 2005/0135439 A1* | 6/2005 | Chapman | H01S 5/141 372/20 |
| 2005/0180713 A1* | 8/2005 | Heideman | G02B 6/122 385/129 |
| 2005/0265403 A1* | 12/2005 | Anderson | H01S 5/143 372/20 |
| 2005/0271325 A1* | 12/2005 | Anderson | G02F 1/295 385/40 |
| 2006/0008596 A1* | 1/2006 | Pokorny | C08J 7/047 428/1.1 |
| 2006/0077319 A1* | 4/2006 | Kitamura | G02F 1/133526 349/95 |
| 2007/0116408 A1 | 5/2007 | Eberle et al. | |
| 2007/0133925 A1 | 6/2007 | Bates et al. | |
| 2007/0206904 A1 | 9/2007 | Sezerman et al. | |
| 2008/0008413 A1* | 1/2008 | Anderson | G02F 1/295 385/8 |
| 2008/0008414 A1* | 1/2008 | Anderson | G02F 1/295 385/8 |
| 2008/0013587 A1* | 1/2008 | Tempea | H01S 3/1112 372/93 |
| 2008/0077225 A1 | 3/2008 | Carlin et al. | |
| 2008/0119739 A1 | 5/2008 | Vardi et al. | |
| 2008/0161548 A1 | 7/2008 | Gupta et al. | |
| 2008/0161648 A1* | 7/2008 | Karasawa | A61B 1/00096 600/182 |
| 2009/0003841 A1* | 1/2009 | Ghidini | G02F 1/0123 398/186 |
| 2010/0013497 A1* | 1/2010 | Evans | G01N 21/84 324/642 |
| 2010/0113942 A1 | 5/2010 | Eberle et al. | |
| 2010/0220956 A1* | 9/2010 | Saarikko | G02B 6/0028 385/37 |
| 2011/0123154 A1 | 5/2011 | Eberle et al. | |
| 2012/0269478 A1* | 10/2012 | Anderson | G02F 1/295 385/3 |
| 2013/0148933 A1 | 6/2013 | Eberle et al. | |
| 2014/0101922 A1 | 4/2014 | Eberle | |
| 2014/0180031 A1 | 6/2014 | Anderson | |
| 2014/0180034 A1 | 6/2014 | Hoseit et al. | |
| 2014/0200438 A1 | 7/2014 | Millett et al. | |
| 2015/0045645 A1 | 2/2015 | Eberle et al. | |
| 2017/0079510 A1 | 3/2017 | Eberle | |
| 2017/0091536 A1* | 3/2017 | Uyeno | G02F 1/295 |

(56) References Cited

U.S. PATENT DOCUMENTS

| | | | |
|---|---|---|---|
| 2017/0153530 A1* | 6/2017 | Anderson | G02F 1/295 |
| 2017/0192264 A1* | 7/2017 | Anderson | G02F 1/1326 |
| 2017/0212404 A1* | 7/2017 | Anderson | G02F 1/29 |

OTHER PUBLICATIONS

Google searches for: "liquid crystal cladding evanescent waveguide" and "liquid crystal evanescent waveguide".*

"U.S. Appl. No. 12/880,028, Final Office Action dated Apr. 1, 2016", 28 pgs.

"U.S. Appl. No. 12/660,028, Final Office Action dated Jun. 20, 2013", 11 pgs.

"U.S. Appl. No. 12/660,028, Final Office Action dated Dec. 4, 2014", 23 pgs.

"U.S. Appl. No. 12/660,028, Non Final Office Action dated Mar. 6, 2014", 14 pgs.

"U.S. Appl. No. 12/660,028, Non Final Office Action dated Jul. 6, 2015", 24 pgs.

"U.S. Appl. No. 12/660,028, Non Final Office Action mailed Dec. 21, 2012", 10 pgs.

"U.S. Appl. No. 12/660,028, Response filed Jan. 4, 2016 to Non Final Office Action dated Jul. 6, 2015", 13 pgs.

"U.S. Appl. No. 12/660,028, Response filed Feb. 26, 2013 to Non Final Office Action dated Dec. 21, 2012", 8 pgs.

"U.S. Appl. No. 12/660,028, Response filed May 29, 2015 to Final Office Action dated Dec. 4, 2014". 10 pgs.

"U.S. Appl. No. 12/660,028, Response filed Sep. 2, 2014 to Non Final Office Action dated Mar. 6, 2014", 11 pgs.

"U.S. Appl. No. 12/660,028, Response filed Oct. 11, 2012 to Restriction Requirement dated Sep. 13, 2012", 3 pgs.

"U.S. Appl. No. 12/660,028, Response filed Dec. 19, 2013 to Final Office Action dated Jun. 20, 2013" 10 pgs.

"U.S. Appl. No. 12/660,028, Restriction Requirement dated Sep. 13, 2012", 8 pgs.

"U.S. Appl. No. 14/221,143, Ex Parte Quayle Action dated Feb. 17, 2016", 11 pgs.

"U.S. Appl. No. 14/221,143, Non Final Office Action dated Apr. 3, 2015", 9 pgs.

"U.S. Appl. No. 14/221,143, Notice of Allowance dated Apr. 11, 2016", 11 pgs.

"U.S. Appl. No. 14/221,143, Notice of Non-Compliant Amendment dated Oct. 23, 2015", 6 pgs.

"U.S. Appl. No. 14/221,143, Preliminary Amendment filed Mar. 20, 2014", 4 pgs.

"U.S. Appl. No. 14/221,143, Response filed Mar. 7, 2016 to Ex Parte Quayle Action dated Feb. 17, 2016", 5 pgs.

"U.S. Appl. No. 14/221,143, Response filed Oct. 1, 2015 to Non Final Office Action dated Apr. 3, 2015", 9 pgs.

"U.S. Appl. No. 14/221,143, Response filed Oct. 24, 2015 to Notice of Non-Compliant Amendment mailed Oct. 23, 2015", 9 pgs.

"U.S. Appl. No. 14/832,574, Supplimental Preliminary Amendment Filed Apr. 7, 2017", 7 pgs.

"U.S. Appl. No. 14/832,574, Amendment filed Feb. 6, 2016". 11 pgs.

"U.S. Appl. No. 14/832,574, Final Office Action dated Jun. 23, 2016", 25 pgs.

"U.S. Appl. No. 14/832,574, Non Final Office Action dated Oct. 8, 2015", 11 pgs.

"U.S. Appl. No. 14/832,574, Preliminary Amendment filed Aug. 21, 2015", 4 pgs.

"U.S. Appl. No. 14/832,574, Response filed Jun. 3, 2016 to Non Final Office Action dated Oct. 8, 2015", 11 pgs.

"U.S. Appl. No. 15/360,752, Examiner Interview Summary mailed Jul. 24, 2017", 9 pgs.

"U.S. Appl. No. 15/360,752, Notice of Allowance mailed Jun. 28, 2017", 21 pgs.

"U.S. Appl. No. 15/481,179, Notice of Allowance mailed Jun. 30, 2017", 20 pgs.

"BBO", Crystech, [online]. Retrieved from the Internet : <URL: http://www.ilphotonics.com/cdv2/CrystechCrystalsOptics/ CrystalsCrystech/Non_LinearCrystals/BBO.pdf>, (Jun. 17, 2013), 4 pgs.

"European Application Serial No. 05722475.0, European Search Report dated Nov. 22, 2007".

"International Application Serial No. PCT/US2005/001586, International Search Report dated Sep. 21, 2006", 1 pg.

"International Application Serial No. PCT/U52005/001586, Written Opinion mailed Sep. 21, 2006", 3 pgs.

"International Application Serial No. PCT/US2005/001758, International Search Report dated Aug. 31, 2006", 1 pg.

"International Application Serial No. PCT/US2005/001758, Written Opinion mailed Aug. 31, 2006", 3 pgs.

"Optical Grade Silicon Wafers", Precision Micro-Optics, [online]. Retrieved from the Internet: <URL: http://www.pmoptics.com/files/ Optical_Silicon_wafer.pdf>, (Feb. 19, 2010), 2 pgs.

"Potassium Titanyl Phosphate (KTP)", Almaz Optics, [online]. [retrieved on Jun. 17, 2013]. Retrieved from the Internet . <URL: http://www.almazoptics.com/KTP.htm>, (Jun. 17, 2013), 4 pgs.

Casson, Joanna L., et al., "Near-IR Turnable Laser with an Integrated LiTa03 Electro-Optic Deflector", Applied Optics, vol. 41, No. 30, (Oct 20, 2002.), 6416-6419.

Clark, Noel A., et al., "Surface-stabilized ferroelectric liquid-crystal electro-optic waveguide switch", Applied Physics Letter, 57(18), (1990), 1852-1854.

Coppola, Giuseppe, et al., "Optoelectronic Router in Glass Waveguide with a Liquid Crystal Cladding", Proceedings of SPIE, vol. 4829—19th Congress of the International Commission for Optics: Optics for the Quality of Life, (2003), 527-529.

Desmat, Hans, et al., "Silicon-on-Insulator Optical Waveguides with Liquid Crystal Cladding for Switching and Tuning", Proceedings of the European Conference on Optical Communication (ECOC) 2003, vol. 3, (2003), 430-431.

Gialorenzi, T. G., et al., "Light scattering from nematic liquid-crystal waveguide", Journal of Applied Physics, vol. 46, No. 3, (Mar. 1975), 1271-1282.

Gialorenzi, T. G., et al., "Lighting Scattering from Smectic Liquid-Crystal Waveguides", Journal of Applied Physics, vol. 47, No. 5, (May 1976), 1820-1826.

Hermann, David S., "Integrated Optics with Liquid Crystals", Chalmers University of Technology, (2000), 1-34.

Hu, Chenming, et al., "Losses of a Nematic Liquid-Crystal Optical Waveguide", Journal of the Optical Society of America, vol. 64, No. 11, (Nov. 1974), 1424-1432.

Hu, Chenming, et al., "Optical Deflection in Thin-Film Nematic Liquid-Crystal Waveguides", IEEE Journal of Quantum Electronics, vol. QE-10, No. 2, (Feb. 1974), 218-222.

Karpierz, M. A., "Nonlinear properties of waveguides with twisted nernatic liquid crystal", Acta Physica Polonica A, vol. 99, (2001), 161-173.

Kobayashi, Morio, et al., "2×2 Optical Waveguide Matrix Switch Using Nematic Liquid Crystal", IEEE Transactions on Microwave Theory and Techniques, vol. MTT-30, No. 10, (Oct. 1982), 1591-1598.

Kwan, Oh Kee, et al., "Proposal of Electrically Tunable External-Cavity Laser Diode", IEEE Photonics Technology Letters, vol. 16, No. 8, (Aug. 2004), 1804-1806.

Li, Zheng, et al., "Radiation Hardness of High Resistivity Magnetic Czochralski Silicon Detectors After Gamma, Neutron, and Proton Radiations", IEEE Transactions on Nuclear Science, vol. 51, No. 4, (Aug. 2004), 1901-1908.

Liu, Zao, "Polarization Cross Coupling in Asymmetric Photonic Waveguides", Thesis, Master of Science, Electrical and Computer Engineering, Northeastern University, Dept. of Electrical and Computer Engineering, (Jan. 1, 2010), 73 pgs.

Maune, Brett, et al., "Electronically tunable ring resonators incorporating nernatic liquid crystals as cladding layers", Applied Physics, vol. 83, No. 23, (2003), 4689-4691.

(56) References Cited

OTHER PUBLICATIONS

Mormile, Pasquale, et al., "A basic element for integrated electro-optical devices based on Liquid Crystal waveguides", Proc. SPIE 4078, (2000), 779-785.

Okamura, Yasuyuki, et al., "Low Voltage Driving in Nematic Liquid Crystal Overlayered Waveguide", Journal of Lightwave Technology, vol. LT -4, No. 3, (Mar. 1986), 360-363.

Repasky, Kevin S., et al., "Tunable External-Cavity Diode Laser Based on Integrated Waveguide Structures", Opt. Eng. 42(8), (Aug. 2003), 2229-2234.

Schnur, Joel M., et al., "Prospectus for the Development of Liquid-Crystal Waveguides", Naval Research Laboratory, NRL Report 7507, (Nov. 10 1972), 21 pgs.

Sheridan, J. P., et al., "Elector-optically induced deftection in liquid-crystal waveguides", Journal of Applied Physics, vol. 45, No. 12, (Dec. 1974), 5160-5163.

Sirleto, Luigi, et al., "Electro-Optical Switch and Continuously Tunable Filter Based on a Bragg Grating in a Planar Waveguide with a Liquid Crystal Overlayer", Opt. Eng. 41(11), (Nov. 2002), 2890-2896.

Sirleto, Luigi, et al., "Optical multimode interference router based on a liquid crystal waveguide", Journal of Optics A: Pure Appl. Opt,. 5(5), (2003), S298-5304.

Sneh, Anat, et al., "High-Speed Continuously Tunable Liquid Crystal Filter for WDM Networks", Journal of Lightwave Technology, vol. 14, No. 6, (Jun. 1996), 1067-1080.

Tien, P K, et al., "Theory of Prism-Film Coupler and Thin-Film Light Guides", Journal of the Optical Society of America, vol. 60, No. 10, (Oct. 1970), 1325-1337.

Ulrich, F., et al., "Offset Prism for Optical Waveguide Coupling", Applied Optics, vol. 13, No. 8, (Aug. 1974), 1850-1852.

Ulrich, R, et al., "Measurement of Thin Film Parameters with a Prism Coupler", Applied Optics, vol. 12, No. 12 (Dec. 1973), 2901-2908.

Ulrich, R, et al., "Optimum Excitation of Optical Surface Waves", Journal of the Optical Society of America, vol. 61, No. 11, (Nov. 1971), 1467-1477.

Ulrich, R., "Theory of the Prism-Film Coupler by Plane-Wave Analysis", Journal of the Optical Society of America, vol. 60, No. 10, (Oct. 1970), 1337-1350.

Valera, J. D., et al., "Bistability and switching in Thin-film waveguides with liquid-crystal cladding", Applied Physics Letter, 48(9), (Mar. 3, 1986), 573-574.

Whinnery, J. R., et al., "Liquid-Crystal Waveguides for Integrated Optics", IEEE Journal of Quantum Electronics, vol. QE-13, No. 4, (Apr. 1977), 262-267.

\* cited by examiner

ND DEVICE

CROSS-REFERENCE TO RELATED APPLICATIONS

This Application is a Continuation which claims the benefit of priority of U.S. patent application Ser. No. 15/360,752 entitled "Electro-Optic Beam Deflector Device" filed Nov. 23, 2016, which is a Continuation which claims the benefit of priority of U.S. patent application Ser. No. 14/832,574, entitled "Electro-Optic Beam Deflector Device" filed Aug. 21, 2015, which is a Divisional and claims the benefit of priority of U.S. patent application Ser. No. 12/660,028, entitled "Electro-Optic Beam Deflector Device" filed Feb. 17, 2010, which claims under 35 U.S.C. §119(e) the benefit of U.S. provisional patent application No. 61/207,851 entitled "Electro-Optic Beam Deflector Device" filed Feb. 17, 2009, the disclosures of which are hereby incorporated by reference in their entirety.

FIELD

This invention relates, in general, to waveguides, and more particularly, to waveguides having liquid crystal materials therein.

BACKGROUND

Various devices such as bar code scanners, compact disk players, DVD players, range finders, designators, etc. use light to perform various functions, such as read data from optical media. Beams of light are also used in devices in communication devices, sample analyzing devices, pointing and designating devices, distance measurement devices, and time measurement devices.

Light can be controlled using standard lenses and mirrors. These passive methods can be made active via mechanical motion. For example, mirrors can be placed on galvo-motors to move the mirror to control the direction of light propagation. This technique is used in barcode scanners, or optical read/write heads in CD/DVD players. However, mechanical control over light is undesirable for several reasons. First, it is difficult to make such mechanical devices compact. Second, the mechanical nature of such moving devices have limited lifetimes due to mechanical wear and failure issues. Third, mechanical devices are inherently vibration sensitive, which limits the type of environment in which they can be used. Finally, mechanical devices necessitate a level of design complexity including gears, bearings, and other mechanical components, which add cost, expense, and maintenance issues to such designs.

Rather than move a lens or a mirror with a motor or actuator, light can be controlled through the use of waveguides. For instance, U.S. Pat. No. 5,347,377 entitled "Planar Waveguide Liquid Crystal Variable Retarder" relates generally to providing an improved waveguide liquid crystal optical device, and discloses in Table 1 the use of alternating current voltages between 2 and 50 volts rms. This patent teaches controlling only the optical phase delay for only TM polarized light.

With conventional waveguides, electro-optic materials are employed whereby a voltage applied across the material changes the index of refraction, n. However, with conventional techniques, the index of refraction can only be changed a very small amount, such as 0.0001 per kilovolt for bulk materials. This limitation makes this type of light control extremely limited, and to date not a viable alternative to mechanical control of light.

While liquid crystal optics have become widespread in display applications, in such applications light is attenuated but not steered nor refocused, or only to a very small degree. In order to use conventional techniques for liquid crystal optics to achieve active optical control, prohibitively thick lasers of liquid crystal (>100 microns) would be needed, which would render the device highly opaque and slow. The thick layers of liquid crystal can take seconds or even minutes to change, and are difficult or impossible to control. Although electro-optic beam-steerers have been made with standard thin liquid crystal cells, such devices have only realized minimal control (in the range of micro-degrees of steering).

U.S. Pat. No. 3,963,310 to Giallorenzi et al. entitled "Liquid Crystal Waveguide" teaches of utilizing liquid crystal—within the cove of a waveguide. However, as recognized by the present inventors, such a waveguide would be problematic in that there would be substantial losses or attenuation of light traveling through such a waveguide. Furthermore, such a waveguide does not provide for control of light in a direction out-of-the-plane of the waveguide.

Accordingly, as recognized by the present inventors, what is needed is a liquid crystal waveguide for controlling light that permits active control of the propagation of light through and out of the waveguide.

SUMMARY

In light of the above and according to one broad aspect of one embodiment of the invention, disclosed herein is a liquid crystal waveguide for dynamically controlling the propagation direction of light as it exits the waveguide. Generally, liquid crystal materials are disposed within a waveguide in a cladding proximate or adjacent to a core layer of the waveguide. Portions of the liquid crystal material can be induced to form refractive or lens shapes in the cladding so as to permit electronic control of the refraction/bending of light as it travels through the waveguide. The waveguide may also have a taper region where the distance between the core of waveguide and an out-coupling medium is decreased towards the output end of the waveguide, which encourages a beam of light or a laser beam, as it travels through the taper region, to exit the waveguide in a direction that is out-of-the-plane of the optical waveguide. The waveguide can therefore control the light beam's propagation direction in both a dimension in the plane of the waveguide and also in a dimension that is out of the plane of the waveguide.

According to another broad aspect of one embodiment of the present invention, disclosed herein is a waveguide for controllably steering a light beam, wherein the waveguide is characterized by an effective index of refraction. In one example, the waveguide includes a core; at least one cladding having a liquid crystal material therein; at least one out-coupling medium having an index of refraction that is larger than the effective index of refraction of the waveguide, wherein the out-coupling medium is separated from the core within the waveguide by a thickness that decreases from a first thickness near the input end of the waveguide to a second thickness near the output end of the waveguide; and at least one electrode for receiving at least one voltage wherein the magnitude of the propagation angle is controlled by the voltage.

In one example, as the light beam travels through the waveguide, at least a portion of the light beam propagates into the out-coupling medium at a propagation angle outof-the-plane of the waveguide. In one embodiment, the waveguide may include an upper cladding provided with liquid crystal material therein, and a lower cladding, and the out-coupling medium is a substrate positioned below a lower cladding. In another embodiment, the waveguide may include an upper cladding, and a lower cladding having liquid crystal material therein, and the out-coupling medium is positioned below the lower cladding and above a substrate layer. In one example of the waveguide, the waveguide supports only one propagation mode per polarization state. The index of refraction of the substrate may be larger than the effective index of refraction of the waveguide.

According to another broad aspect of one embodiment of the present invention, disclosed herein a waveguide including a core for guiding a light beam; at least one cladding having a liquid crystal material within at least a portion of said cladding; a taper region wherein at least a portion of the light beam is transferred out of the waveguide and into an out-coupling medium at a propagation angle; and at least one electrode, wherein as a voltage is applied to said electrode, the propagation angle is controllably altered.

In the taper region of the waveguides the distance between the core of the waveguide and an out-coupling medium is decreased towards the output end of the waveguide, which encourages a beam of light or a laser beam, as it travels through the taper region, to exit the waveguide in a direction that is out-of-the-plane of the optical waveguide. The waveguide can therefore control the light beam's propagation direction in both a dimension in the plane of the waveguide and also in a dimension that is out of the plane of the waveguide.

The foregoing and other useful features and advantages of the invention will be apparent from the following more particular description of a various embodiments of the invention as illustrated in the accompanying drawings.

DETAILED DESCRIPTION

Disclosed hereto are various embodiments of a substantially planar waveguide for dynamically controlling the propagation direction of light passing through and out of the waveguide. Generally and in accordance with an embodiment of the present invention, liquid crystal materials are disposed within a waveguide in a cladding proximate or adjacent to a core layer of the waveguide. In one aspect of the mention, the waveguide may contain taper regions wherein the light exits the waveguide at a propagation angle out-of-the-plane of the waveguide. Furthermore, the magnitude of the propagation angle may be electronically controlled and therefore the light may be electronically steered as it exits the waveguide. In another aspect of the invention, portions of the liquid crystal material can be induced to form refractive shapes in the cladding so as to permit electronic control of the refraction/steering of light in-the-plane of the waveguide. In another aspect of the invention, the in-plane steering of light provided by the refractive shapes may be combined with the out-of-plane steering provided by the taper regions, thereby providing both in-plane and out-of-plane steering in a single waveguide device.

Figure 3:
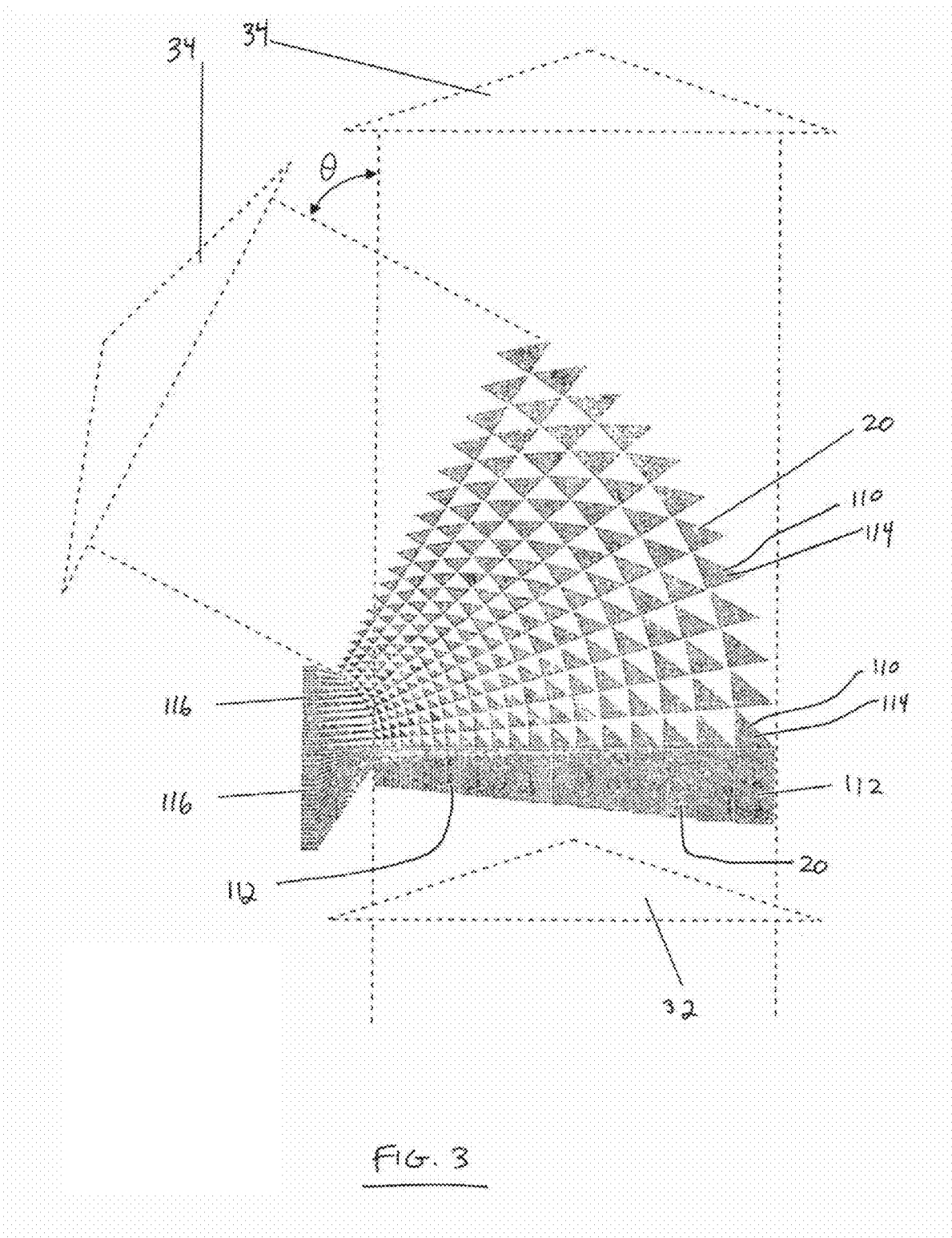
FIG. 3 illustrates a top view an example of a waveguide having patterned electrodes for providing active control of light propagation in a waveguide, in accordance with an embodiment of the present invention.
Figure 4:
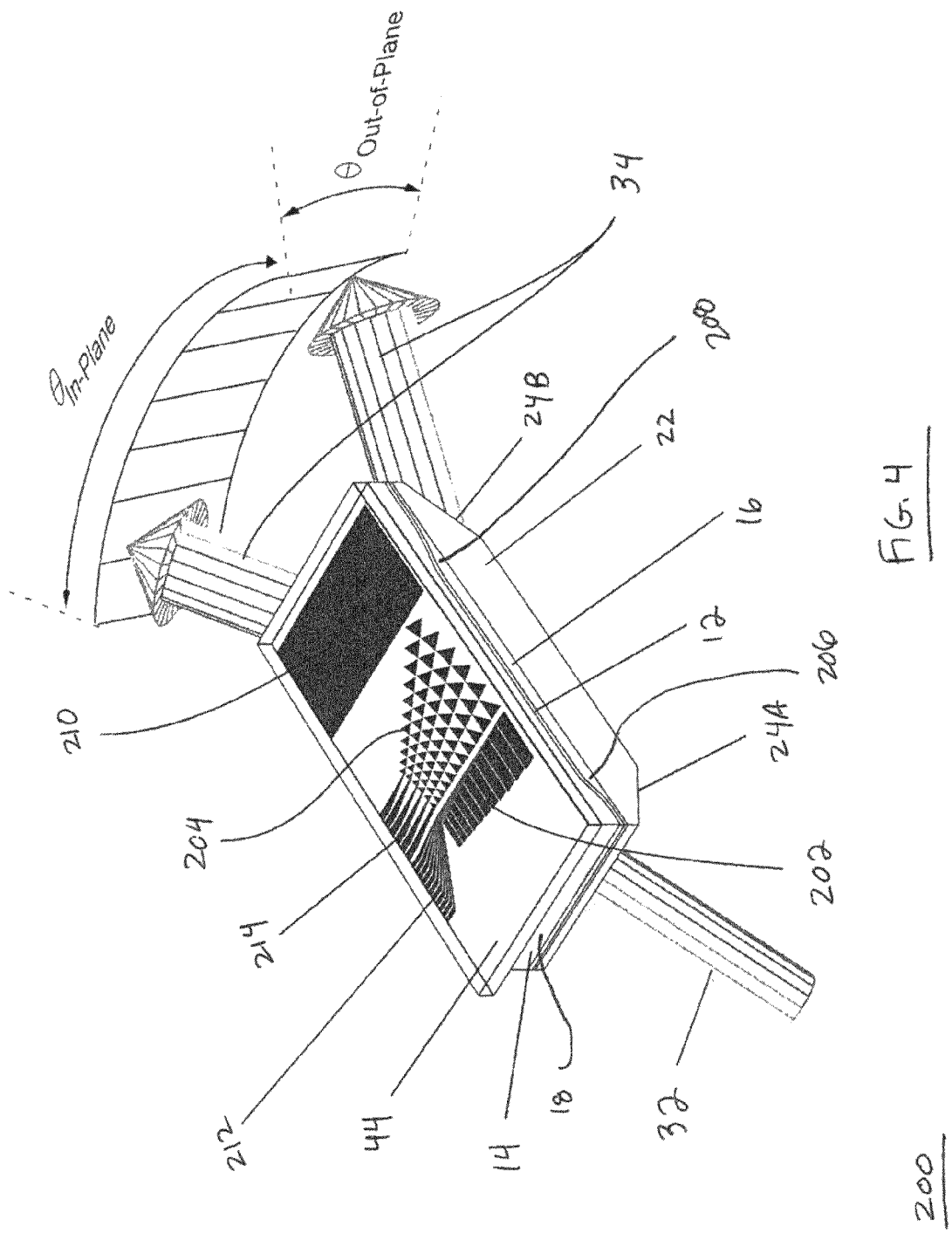
FIG. 4 illustrates an isometric view of an example of a waveguide having both patterned electrodes and taper regions for providing active control of light propagation, in accordance with an embodiment of the present invention.

As disclosed herein, a waveguide may be formed using one or more taper regions that provide for controllably steering the light beam out-of-the-plane of the waveguide (see FIGS. 1-2), or alternatively, a waveguide may be formed using one or more patterned electrodes that induce refractive shapes for controllably steering the light beam in-the-plane of the waveguide (see for example FIG. 3), or alternatively, a waveguide may be formed with both a taper region and one or more patterned electrodes for providing electronic steering of the light beam both in-the-plane and out-of-the-plane of the waveguide (see FIG. 4). Various embodiments of the present invention are described hereto.

Figure 1:
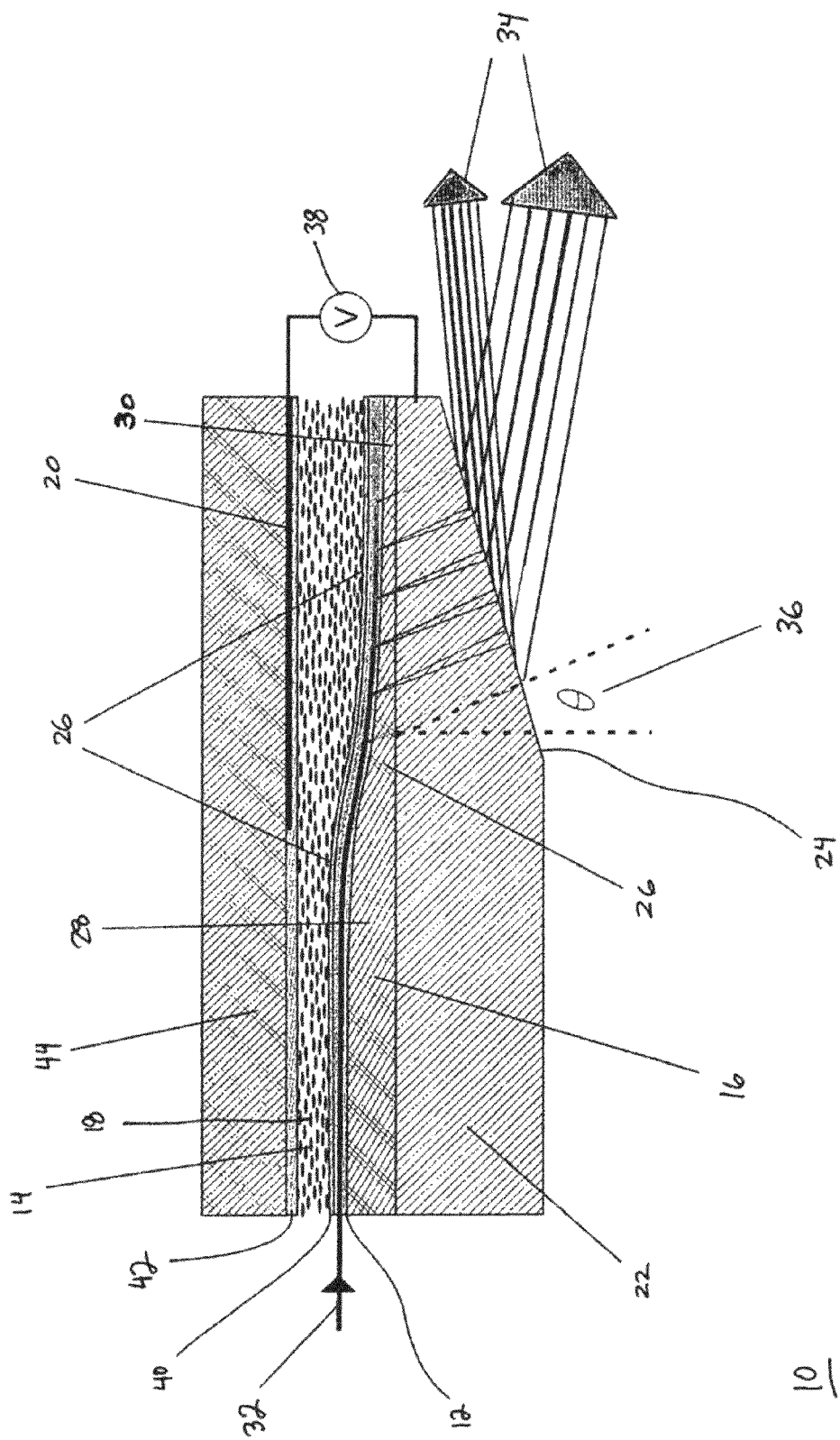
FIG. 1 illustrates a cross-sectional side view of an example of a waveguide having a taper region for providing active control of the angle at which the light leaves the waveguide, in accordance with an embodiment of the present invention.

As shown in the cross-sectional view of a waveguide 10 in FIG. 1, in one example, the waveguide 10 may include a core 12, a pair of claddings 14, 16 surrounding the core 12 wherein one of the claddings (e.g., the upper cladding 14) contains liquid crystal material 18 therein. In one example, one or more electrodes or an electrode layer 20 is positioned above the upper cladding 14 that has the liquid crystal material 18 therein, and a lower electrode or electrode layer or plane 22 is positioned below the lower cladding 16 and may act as a ground plane. In another example, a substrate 22 may be positioned below the lower cladding 16. The substrate 22 may be constructed of a high index material and may serve as an out-coupling medium. The substrate 22 may include one or more angled facets 24 along its bottom surface. In another example, the substrate 22 may also be the lower electrode. In another example, the substrate 22 may be separated from the core 12 by a distance, wherein the distance may vary across the waveguide 10.

In one example, the waveguide 10 may contain a taper region 26, wherein the distance between the core 12 and the out-coupling medium 22 may decrease from a first thickness 28 to a second thickness 30 along the length of the waveguide 10, wherein in one example the first thickness is larger than the second thickness as shown in FIG. 1. In the example of FIG. 1, the taper portion 26 may be defined as a transition in thickness of the upper cladding 14, and a corresponding transition in the thickness in the lower cladding 16. In one example, the upper cladding 14 has an initial thickness that increases along the length of the waveguide 10 and through the taper region 26, to a terminal thickness which is larger than the initial thickness. Conversely, the lower cladding 16 has an initial thickness 28 that decreases along the length of the waveguide 10 and through the taper region 26, to a terminal thickness 30 which is smaller than the initial thickness 28. The core layer 12 may have a generally constant thickness along the length of the waveguide 10. As shown in FIG. 1, the core layer 12 may have an initial flat or planar portion, a curved or arcuate portion through the taper region 26, and a second flat or planar portion towards the output end of the waveguide 10.

As the light 32 propagates through the core 12 of the waveguide 10 and into the taper region 26, the evanescent tail of the guided light may penetrate into the out-coupling medium 22. As the distance between the core 12 and the out-coupling medium 22 decreases from a first thickness to a smaller second thickness, more of the evanescent tail of the light penetrates into the out-coupling medium 22. In one example, the index of refraction of the out-coupling medium 22 may be larger than the effective index of the waveguide 10, in which case at least some of the output light 34 may leave the waveguide and propagate into the out-coupling medium 22 at a propagation angle that is out-of-the-plane of the waveguide 10. The light beam 12 may then leave the out-coupling medium 22, through an angled facet 24, and therefore propagate into free space its an output beam 34.

In one example, the shape of the taper region 26 is smooth, arcuate and continuous. In other words, as the distance between the core 12 and the out-coupling medium 22 is decreased or tapered from a first thickness to a second thickness, the shape of this taper 26 may be a smooth and continuous transition such as an s-taper or other smooth shape. In this case, where the thickness is large, the evanescent tail of the light beam 32 is only slightly in contact with the out-coupling medium 22, and therefore the intensity of the out-coupled light 34 is small. As the thickness is decreased, the amount of contact between the evanescent tail of the light beam 32 and the out-coupling medium 22 is increased and therefore the amount of light 34 that leaves the waveguide 10 is also increased. This continues, until the light intensity within the waveguide is sufficiently drained such that less light leaves the waveguide simply because there is less light still within the waveguide. In this manner the intensity profile of the light 34 leaving the waveguide 10 can be a smooth and continuous shape, such as a Gaussian profile or another smooth profile. In another example, the shape of the taper region 26 may be sharp or discontinuous, such as a step or otherwise steep edge.

In general and as discussed below, at least two indices of refraction can be realized within an electro-optic beam deflector waveguide device 10 made according to embodiments of the present invention. The first index of refraction, n1, is the index of refraction for the light that is guided or trapped within the waveguide 10. This is determined as an average or combination of: i) the index of refraction of the lower cladding, ii) the index of refraction of the core, and iii) the index of refraction of the upper cladding (in one example, the index of refraction of the upper cladding 14 (which contains a liquid crystal material 18) can be varied as described herein). This average or combination of these indexes of refraction is referred to as the effective index of the waveguide, n1.

A second index of refraction, n2, is the index of refraction of the out-coupling medium 22. In one embodiment of the invention, the index of refraction of the out-coupling medium 22 is larger than the effective index of the waveguide. In this case, as the light beam 32 enters into the taper region 26, the light beam will leave the waveguide and propagate into the out-coupling medium 22 at an out-of-plane propagation angle 36 with respect to the plane of the waveguide or the waveguide normal. The magnitude of the propagation angle 36 will depend on the difference between the effective index of the waveguide, n1, and the index of refraction of the out-coupling medium, n2.

The liquid crystal material 18 (for example, in the upper cladding 14 as shown in FIG. 1) can be characterized as having a tunable and dynamic index of refraction. As voltage 38 is applied and increased between the upper patterned electrode(s) 20 and the lower electrode plane 22, the index of refraction of the liquid crystal material within the upper cladding 14 is controllably changed as a function of the 38 voltage applied. Depending upon the implementation, the applied voltage 38 can be a DC voltage, or an AC voltage, for instance, at low frequencies to high frequencies such as 50 KHz, or a plurality of discrete voltages applied to individual electrodes. In this way n1, the effective index of the waveguide, may be controllably altered with voltage.

In one example, as n1 increases, the magnitude of the propagation angle 36 at which the light 34 leaves the waveguide 10 will also increase. Hence, the propagation angle 36 of light as it leaves the waveguide can be controlled electronically and without any moving parts to perform numerous useful functions, such as for use in a bar code scanner, a CD/DVD read/write head, a tunable laser, or other applications.

A waveguide 10 formed to accordance with an embodiment of the present invention may be generally rectangular in shape and may include a core 12 having a generally rectangular cross-section or defining a parallel piped. On the front end of the waveguide 10, light 32 is introduced into the waveguide core 12 and propagates along the length of the waveguide into the taper region 26. As shown in FIG. 1, the direction of propagation of light through the waveguide is generally along the length of the waveguide 10, until the light enters into the taper region 26 at which point at least part of the light beam leaves the waveguide 10 at a propagation angle 36 out-of-the-plane of the waveguide. Since the magnitude of this propagation angle 36 may be controllably altered with voltage, use of embodiments of the present invention permit the propagation angle 36 to be controllably altered depending, in part, on the voltages 38 applied between the upper electrodes 20 and the lower electrode or plane 22.

As shown in FIG. 1, in one example, a waveguide 10 may include a substrate 22 such as a P-doped silicon substrate or any other conductive material, which provides structural support for the waveguide and also acts as a lower electrode or ground plane to which a voltage 38 may be applied. The substrate 22 may also function as the out-coupling medium. For infrared wavelengths the P-doped Si substrate 22 may also serve as the out-coupling medium. Alternatively, the substrate 22 can be nonconductive, such as a glass or crystal, and a conductive coating or electrical ground plane can be applied to the top of the substrate surface, between the substrate 22 and lower cladding 16. This conductive coating can be ITO, or any other of a number of transparent conductive coatings. The conductive substrate 22 is also referred to herein as the lower electrode.

A lower cladding layer 16 is provided on the substrate 22 and is preferably made of any dielectric materials with low absorptions whose index of refraction is less than the index of refraction of the core 12. Suitable materials include Silicon OxyNitride, Silicon-Rich Nitride, Silicon Nitride, Tantalum Pentoxide, Polymers, Pure Silicon, Ion exchange glass on substances such as Lithium Niobate, Sol-Gel, thermally oxidized silicon, glass. In one example, the interface between the lower cladding 16 and the core layer 12 is transparent so that light can penetrate the lower cladding 16 as it propagates through the core 12. In one example, the lower cladding 16 has a thickness that is tapered.

On top of the lower cladding 16, a waveguide core 12 or core material is provided. In one embodiment, the core 12 does not include any liquid crystal material 18 therein. The core 12 may be made of materials such as any dielectric materials with low absorptions whose index of refraction is greater than the index of refraction of the upper and lower claddings 14, 16. Suitable materials include, but are not limited to, Silicon OxyNitride. Silicon Rich Nitride, Silicon Nitride, Tantalum Pentoxide, Polymers, Pure Silicon, Ion exchange glass on substances such as Lithium Niobate, Sol-Gel, thermally oxidized silicon, glass. Furthermore, a core 12 may have a constant index of refraction along the length of the waveguide, or alternatively have an index of refraction that varies across or along the device 10.

On top of the core layer, an alignment layer 40 (shown as the lower alignment layer in this example of FIG. 1) is provided which is used to initially align or bias the orientation of liquid crystal material 18 in the upper cladding 14 that is proximate to or adjacent to the alignment laser 40 and the core 12. Alignment can be achieved, for example, by buffed polyimide, nylon, or other polymer coating applied to the core 12 and or the coverplate 44, photo-aligned polyimide, polymer or other photo-aligned material, angle deposited SiO, $SiO_2$ or other angle deposited material, microgrooves etched into the core 12 and or coverplate 44, ion-buffed surfaces on the core 12 or lower cladding 16, a dispersed polymer matrix that is photoaligned, or direct buffing of either surface. In one example the alignment layer or layers may be a coating that induces a homeotropic alignment in the liquid crystal 18. In one example, the lower alignment layer 40 is generally transparent.

On top of the lower alignment layer, the upper cladding 14 is provided having liquid crystal material 18 therein as shown in FIG. 1. In one example, the interface between the lower alignment layer 40 and the upper cladding 14 is transparent. The liquid crystal material 18 may include, but is not limited to, any nematic liquid crystal, with either a positive dielectric constant or a negative dielectric constant or a mixture of each, polymer dispersed liquid crystal material. Smectic A* and C* liquid crystal material, cholesteric liquid crystal material such as ferroelectrics and surface stabilized ferroelectrics, or dual-frequency liquid crystal material, for example.

In one example, the upper cladding 14 is formed using spacer material to define a region or volume wherein liquid crystal material 18 may be contained therein, and optically transparent glue such as Norland 68 may be used to create transparent boundary walls to contain the liquid crystal 18.

On top of the upper cladding 14, an upper alignment layer 42 may be provided to initially align or bias the orientation of liquid crystal material 18 that is adjacent to or proximate to the upper alignment layer 42. As with the lower alignment layer 40, alignment can be achieved, for example, by buffed polyimide coating applied to the core 12 and or the cover plate 44, photo-aligned polyimide, angle deposited SiO and or $SiO_2$, microgrooves etched or otherwise formed into the core 12 and or coverplate 44, ion-buffed surfaces on the core or lower cladding, a dispersed polymer matrix that is photoaligned, or direct buffing of either surface. In one example, the upper alignment layer 42 is generally transparent.

The alignment of the liquid crystal 18 between the lower and upper alignment layers 40, 42 can be anti-parallel, parallel, twisted, or hybrid between twisted and parallel or anti-parallel. The direction of liquid crystal alignment can be at any angle with respect to the direction of light propagation. Described below are examples of where the alignment of the liquid crystal materials 18 is adapted to provide for refraction of TE or TM modulated light as it passes through a waveguide made according to embodiments of the present invention.

On top of the upper alignment layer 42 and below the glass cover 44, an upper electrode layer 20 is provided. In one example, the upper electrode layer 20 is a conductive coating applied to the bottom surface of the glass cover 44. The conductive coating can include, but is not limited to, ITO, Au, Ag, Al, Cu, or any other conductive coating. In another example, the upper electrode 20 can be p-doped silicon or any metal, such as silver, copper, aluminum, gold, titanium, alloys, or other conductive material, etc.

A glass cover or coverplate 44 may be made of materials such as, but not limited to, standard float glass such as Corning 1737, fused silica, or any flat surface. Since the evanescent portion of the light does not pass through the coverplate 44, the coverplate 44 can be made from non-transparent materials such as silicon wafers, ceramics, or polished metal surfaces. In another embodiment, the coverplate 44 may be a metal or any other conductive material and serve as the upper electrode.

Preferably, the core layer 12 is surrounded by an upper and lower cladding 14, 16, wherein the interfaces between the lower cladding 16 and the core layer 12 and between the upper cladding 14 and the core layer 12 are transparent. As light 32 enters the core layer 12 and propagates through the core along the length of the waveguide, the evanescent portion of the propagating light waves penetrates Into both the upper and lower cladding 14, 16. Preferably, the core layer 12 has a fixed index of refraction, and the lower cladding 16 also has a fixed index of refraction (FIG. 1). By providing liquid crystal material 18 within the upper cladding 14, a portion of which is controllably subjected to an electric field between the upper electrode 20 and the substrate 22, the index of refraction the upper cladding layer 14 can be controllably altered. Stated differently, the average index of refraction (also referred to herein as the effective index of refraction) of the upper cladding 14, core 12, and lower cladding 16 as experienced by a single TM or TE mode of light in the waveguides can be controllably altered by altering the index of refraction of the upper cladding 14. Because the liquid crystal material 18 is disposed within the upper cladding 14 and interacts primarily with the evanescent portion of the light wave and the fundamental portion of the light wave passes through the core material 12, there is no significant attenuation of the intensity of the light as the light passes through the waveguide, which permits the length of the waveguide to be beneficially long so that the size of the output beam 34 can be sufficiently large.

Furthermore, the evanescent portion of the light is only interacting with the liquid crystal molecules 18 that are close to the alignment layer 40. These molecules are more highly ordered than liquid crystal molecules further away from the alignment layer 40 and therefore scatter less light. In one example, the losses are sufficiently low (e.g., less than 0.5 dB/cm) that the waveguide length can be lengthy (e.g., 4 inches or greater).

While FIG. 1 shows a particular arrangement of layers of a waveguide according to one embodiment of the present invention, it is understood that the present invention contemplates variations of this arrangement.

Figure 2:
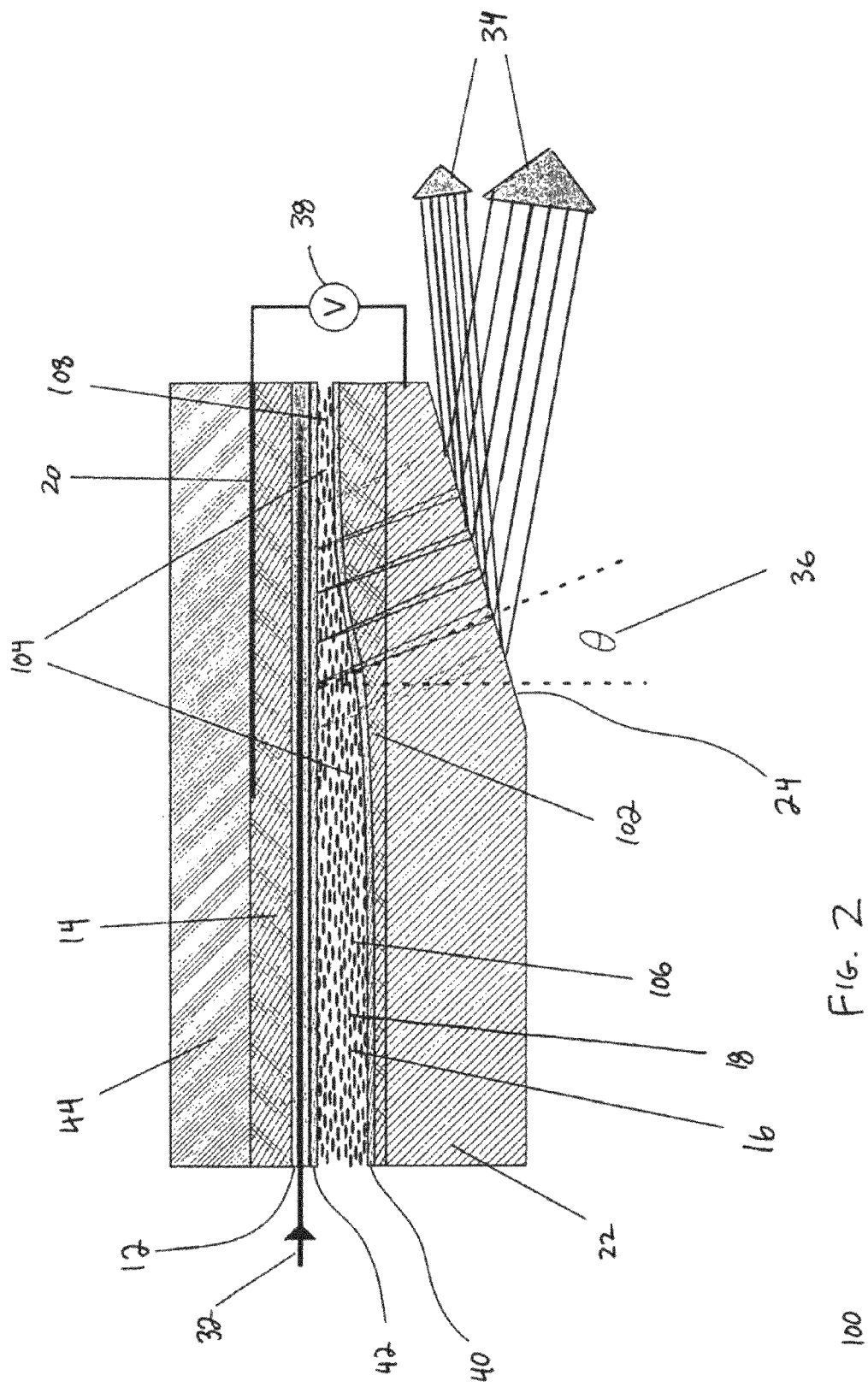
FIG. 2 illustrates a cross-sectional side view of another example of a waveguide having a taper region for providing active control of the angle at which the light leaves the waveguide. In accordance with an embodiment of the present invention.

FIG. 2 shows a cross-sectional side view of another example a waveguide 100. In this example, the core layer 12 and the upper cladding 14 are substantially flat and planar throughout the length of the waveguide 100. The lower cladding 16 may contain the liquid crystal material 18 so as to provide a tunable index of refraction, and the upper cladding 14 may contain a material with a constant index of refraction. An out-coupling medium 102 (formed of materials such as tantalum pentoxide, aluminum oxide, silicon nitride, silicon, or other materials with a sufficiently large index of refraction) may be provided between the lower cladding 16/alignment layer 40 and the substrate 22, wherein the out-coupling medium 102 may include a taper region 104. In this example, the lower alignment layer 40 may be deposited on top of the out-coupling medium 102.

In the example of FIG. 2, the taper portion 104 is defined as a transition in thickness of the lower cladding 16, and a corresponding transition in the thickness in the out-coupling medium 102. In one example, the lower cladding 16 has an initial thickness 106 that decreases along the length of the waveguide 100 and through the taper region 104, to a terminal thickness 108 which is smaller than its initial thickness. Conversely, the out-coupling medium 102 has an initial thickness that increases along the length of the waveguide through the taper region 104, to a terminal thickness which is larger than its initial thickness. The core layer 12 may have a generally constant thickness along the length of the waveguide 100, and as shown in FIG. 2, the core layer 12 may be substantially flat or planar along the length of the waveguide.

Embodiments of the present invention can be used to selectively control the propagation angle for particular types of polarized light, such as TM polarized light and TE polarized light. Generally, TM (Transverse Magnetic) polarized light means that the magnetic field of the light wave is traversing the plane of the waveguide, while the electric field is substantially perpendicular to the plane of the waveguide. TE (Transverse Electric) polarized light is characterized by the electric field of the light traversing the plane of the waveguide, while the magnetic field of the light is substantially perpendicular to the plane of the waveguide. Furthermore, in one example the waveguide may be constructed such that the waveguide only supports and single TE mode and/or only a single TM mode of light. This is referred to as a single mode waveguide. In one example, the thickness of the waveguide core 12 may be sufficiently small such that the waveguide is single mode. In another example, the difference between the index of refraction of the core 12 and the claddings 14, 16 may be sufficiently small such that the waveguide is single mode. In another example the waveguide may support multiple TE and TM modes.

In another embodiment of the present invention, the one or more upper electrodes 20 may define one or more shapes 110 having at least one edge or interface that is non-normal to the direction of light propagation through the waveguide, as shown in FIG. 3. The one or more shapes 110 defined by the upper electrode(s) 20 may be used to controllably refract or bend light in-the-plane of the waveguide as the light 32 passes through the core and upper and lower claddings of the waveguide. The upper electrodes 20, also referred to herein as patterned electrodes, may be shaped or patterned in various manners, including generally triangular or wedge shaped for steering light in-the-plane of the waveguide.

In general, at least two indices of refraction can be realized within a waveguide made according to embodiments of the present invention, such as the example of FIG. 3. The liquid crystal material which is not beneath the patterned electrode(s) 20 may be characterized as having a first index of refraction n3, and n3 is generally unaffected by the application of the voltage to the patterned electrodes.

The liquid crystal material beneath the patterned electrode(s) 20 can be characterized as having a tunable and dynamic index of refraction n4. In one example, when no voltage 38 is applied to the upper electrode, n4 equals n3 and no refraction occurs. As voltage 38 is applied and increased between the upper patterned electrode(s) 20 and the lower electrode plane 22, the index of refraction n4 of the liquid crystal material 18 under the upper patterned electrode(s) 20 is controllably changed as a function of the voltage applied. Depending upon the implementation, the applied voltage can be a DC voltage, or an AC voltage, for instance, at low frequencies to high frequencies such as 50 KHz, or discrete voltages applied to each electrode 20.

Hence, as the difference between n4 and n3 increases, the amount of refraction or bending of light passing through the waveguide can be increased as well. Hence, the amount of bending or refraction of light as it passes through the waveguide can be controlled electronically and without any moving parts to perform numerous useful functions, such as for use in a bar code scanner, a CD/DVD read/write head, a tunable laser, or other applications.

Referring to FIG. 3, in one example of the present invention, the one or more patterned electrodes 20 may be formed as one or more (e.g., an array of) phase electrodes 112 in series with one or more (e.g., an array of) prism or wedge shaped electrodes or rows thereof 114 so as to accept a larger aperture of input light into the waveguide. Each phase electrode 112 may be independently addressable with a unique voltage 38, if desired.

As shown in FIG. 3 a single in-plane steer electrode 114 may contain a series of lateral or side-by-side wedges or prisms 110 such that as voltage is applied to the electrode 114, each sub-prism or sub-wedge 110 of the patterned electrode 114 receives the applied voltage and may each steer a portion of a larger input beam. Stated differently, each individual steer electrode 114 may contain a series of lateral or side-by-side wedges or prisms 110 that are electrically connected together. In this way, a single patterned electrode 114, which can be constructed of several side-by-side prism or wedge shapes 110 that are electrically coupled together, may controllably steer a larger input beam in the in-plane direction as the light beam travels along the waveguide. This patterned electrode 114 is also referred to as a row electrode. Each row electrode 114 may be independently addressable with a unique voltage, if desired.

In another example of the invention and as shown in FIG. 3, a series of row electrodes 114 may be placed subsequent to one another (or cascaded without being electrically connected to one another) in order to realize a larger in-plane steer angle. At full voltage applied to all row electrodes 114, each sub-prism 110, which is itself a portion of a row electrode, deflects its portion of the incoming beam square onto the sub-prism of the subsequent row electrode and the beam exits normal to the last row electrode.

For intermediate values of steering, rows 114 may receive a full voltage up to a desired intermediate row electrode, which is held at an intermediate value of voltage. The remaining rows may be off (e.g., receive no applied voltage) and give no further deflection to the light beam. To obtain continuous steering of light, the first row electrode receives a voltage from zero to full voltage and then fixed at full voltage, then the next row electrode receives a voltage from zero increasing to full voltage and then to a fixed voltage; and the process can be repeated for each next row electrode.

The array of electrode rows shown in FIG. 3 is diffractive in nature since there will be abrupt phase shifts in the exiting wavefront at the prism interlaces defining each column. However, these phase shifts can be removed or reduced by applying a voltage to the phase shifting electrodes 112 at the beginning of the array. Hence this array can provide nearly diffraction-free performance at the expense of a larger number of electrodes. In one example, as shown in FIG. 3, there are 20 phase electrodes (squares) 112 and 12 row electrodes 114 for a total of 32 electrical connections to the coverplate. The electrodes may be constructed so as to have contact points 116 along an edge of the waveguide device. In one example, the series of subsequent row electrodes may be designed to provide steering of a 5 cm wide beam over an angular deflection of 60 degrees.

In another example of the invention, as shown in FIG. 4, a waveguide 200 includes an array of patterned electrodes 202, 204 for in-plane phase control and steering may be combined with a waveguide taper region in the waveguide for out-of-plane steering—to provide steering both in-the-plane of the waveguide and out-of-the-plane of the waveguide. In this example, a first waveguide taper region 206 may be used for coupling of a light input beam 32 into the waveguide 200. As shown in FIG. 4, the substrate facet 24A,B may be polished at an angle at the input end for coupling-in of the input light beam, and may be polished at an angle at the output end for coupling-out of the output light beam. The input light beam 32 may impinge on the angled substrate facet 24A such that the light beam enters into and propagates inside of the substrate 22. Furthermore, the position and angle of the input light beam may be such that is also impinges on a first taper-region 206 within the waveguide such that the light beam transfers or couples from the substrate 22 into the waveguide core 12 and claddings 14, 16 as a guided mode of light. In one example, the waveguide has an upper and a lower cladding 14, 16 and the upper cladding 14 may contain liquid crystal material 18. Furthermore, the waveguide may contain a lower electrode and one or more patterned upper electrodes 202, 204. In one example, the substrate 22 may serve as the lower electrode. As shown in FIG. 4, the one or more patterned upper electrodes may include phase electrodes 202, or rows of prism electrodes or wedge electrodes 204, or any combination of these or other shapes. In one example, one or more control voltages may be applied to the patterned upper electrodes through contacts 212, 214 to control and steer the beam of light in a direction that is in-the-plane of the waveguide. In another example, after the light has traversed underneath the patterned electrodes, the light may then enter onto a second taper region 208 such that at least a portion of the light beam leaves the waveguide and propagates into an out-coupling medium at a propagation angle. In one example the out-coupling medium may also be the waveguide substrate 22. Furthermore, an upper electrode 210 may be placed above the second taper region 208 such that as voltage is applied to the upper electrode, the out-of-plane propagation angle for the light propagating into the out-coupling medium and out of the waveguide may be controllably altered with voltage.

Furthermore, as the light beam propagates through the out-coupling medium 22 it may impinge on an angled output facet 24B such that the light beam leaves the out-coupling medium and propagates into free space as an output light beam. In this way, the output light beam may be controllably steered in both the horizontal/lateral/azimuthal direction, and in the vertical/elevation direction.

Embodiments of the present invention may be used in conjunction with conventional digital and analog circuitry, either separately or integrated on a single integrated circuit. For instance, the voltage applied to one or more patterned electrodes 202, 204, 210 may be controlled by a microprocessor or other logic or programmable logic devices, and such logic may be included on-chip with the waveguide.

While FIGS. 1-4 show a particular arrangement of layers of a waveguide according to embodiments of the present invention, it is understood that the present invention contemplates variations of this arrangement. As one example of an embodiment of the current invention, the use of other electro-optic or thermo-optic materials may be used in addition to or in place of voltage controlled liquid crystal materials. In one example, light crystal materials may be used in a thermo-optic configuration wherein their index of refraction is controllably altered with temperature. In another example, electro-optic or thermo-optic polymer and/or poled polymer materials may be used. Furthermore, non-organic electro-optic materials maybe also be used such as lithium niobate, KTP, or any other electro-optic material.

In accordance with an embodiment of the present invention, waveguides can be formed incorporating one or more features as disclosed in the following pending applications and issued patents, the disclosures of which are hereby incorporated by reference in their entirety: U.S. patent application Ser. No. 11/040,549 filed Jan. 21, 2005, entitled "Tunable Laser Having Liquid Crystal Waveguide" and published as U.S. Patent Application Publication No. US5005/0265403; U.S. patent application Ser. No. 10/963,946 filed Oct. 12, 2004, entitled "Liquid Crystal Waveguide Having Refractive Shapes for Dynamically Controlling Light" and published as U.S. Patent Application Publication No. US2005/0271325; and U.S. Pat. No. 7,570,320 issued Aug. 4, 2009, entitled "Thermo-Optic Liquid Crystal Waveguide."

EXAMPLE

Described below is an example of a liquid crystal waveguide in which the waveguide was designed to provide for 2 degrees of steering out-of-the-plane of the waveguide. It is understood that this example is provided for illustrative purposes only, and does not limit the scope of embodiments of the present invention. In one example, a waveguide beam steering device may be formed utilizing a p-doped silicon wafer, with both sides polished, as the lower electrode, which may be a thick Si wafer, for example, the thickness may be 5 mm and the wafer may be polished to be flat. Upon the p-doped silicon wafer, a silica layer may be deposited with a thickness of 600 nanometers. On top of the silica layer another silica layer may be deposited through a mask so as to create a taper in the thickness of silica. This second layer may be deposited to a thickness of 1200 nm such that the taper region has a first thickness of 1800 nm and a second thickness of 600 nm. The taper region may extend over 1 mm or over several mms. In this example, two 1 mm long taper regions were constructed, the first for coupling of the input light beam into the waveguide and the second for transferring the light beam out of the waveguide and into the out-coupling medium, which in this case was the 5 mm thick Si substrate.

Once the above mentioned layers have been applied, the wafer may be diced into smaller 20 millimeter by 60 millimeter parts, or into other sizes. Each diced part may then be coated with an alignment film approximately 120 angstroms in thickness. The alignment film was used to create the homogeneous orientation of the liquid crystal upper cladding. The film was produced by spin coating an 9:1 mixture of Nissan polyimide varnish solvent #4L to Nissan polyimide type 7992 filtered at 0.2 microns at 2000 revolutions per minute. The same spin coating process was performed on the cover plate, which was made of 90 mil thick fused quartz glass coated on one side with an indium tin oxide (ITO) film to produce the 100 ohms/square conductive layer used for the upper electrodes.

Once both the wafer and the patterned cover glass were coated, the polyimide was imidized by baking in an oven at 200 degrees Celsius for approximately 1 hour. The polyimide coatings were mechanically buffed with a dense piled cloth to induce preferential alignment along the light wave propagation direction of the waveguide. The liquid crystal upper cladding layer was formed by spacing the ground plane cover glass window from the diced wafer parts with 5-micron borosilicate glass spacers immersed in a ultraviolet curing adhesive Norland 68. Approximately 500-micron dots of the spacing mixture were placed at the four corners that created the cell gap for the liquid crystal to be disposed therein. The cover plate was attached to the rest of the waveguide so as to create an anti-parallel alignment layer on the waveguide core. The cell gap was then exposed to 365 nanometer light until fully cured. Straight Norland 68 was used to backfill via capillary action the remaining exposed edges making up the cell gap. One 3-millimeter openings was left 90 degrees to the buff direction. BLO37 liquid crystal, obtained front EMD Chemicals, Inc., was then introduced to one of the two edge openings and allowed to fill the cell gap via capillary force. Once filled, the holes were plugged by using Norland UVS-91 visible-uv curing adhesive. Once the above waveguide structure was fabricated angled input and output facets were fabricated. This was accomplished by grinding and then polishing the 5 mm thick Si wafer to yield angled facets. The facet angle was chosen such that the incoming and outgoing light beams were at normal incidence to the angled substrate facet. 30 AWG braided wires were then attached to the two upper electrodes and one lower electrode using conductive epoxy.

TM light at a wavelength of approximately 1550 nm was introduced into the TM0 mode of the waveguide. Amplitude modulated 5 KHz square-wave drive voltages were applied to the ITO upper electrode change the effective index of waveguide in the second or out-coupling taper region. To measure the beam deflection change as a function of applied voltage, a InGaAs CCD video camera was used to visually map the output light beam on a screen. The experimental results are shown in Table 1.

TABLE 1

| Upper Electrode Voltage (RMS Volts) | Relative Out-of-Plane Propagation Angle (Deg) |
|---|---|
| 0 | 0 |
| 10 | 0.6 |
| 15 | 0.86 |
| 25 | 1.3 |
| 50 | 1.8 |
| 75 | 2.05 |
| 100 | 2.25 |

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations are not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. Inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

The invention claimed is:

1. A planar waveguide for adjusting an angle of a light beam in two dimensions, the planar waveguide comprising:
   a waveguide core sized and shaped to guide the light beam along a length of the waveguide;
   a cladding including a liquid crystal material, the cladding being sized and shaped to provide an interaction between an evanescent portion of the light beam and the liquid crystal material and confine the light beam within the waveguide core in an out-of-plane direction in a first region of the waveguide;
   an out-coupling medium located to receive an evanescently coupled portion of the light beam at a first out-of-plane angle and a first in-plane angle from the waveguide core in a second region of the waveguide;
   a first electrode located proximal to a first region of the waveguide and configured to adjust an angle of the light beam in an in-plane direction by adjusting an index of refraction of the liquid crystal material in the first region to establish the first in-plane angle at which the evanescently coupled portion of the light beam enters the out-coupling medium; and
   a second electrode located proximal to a second region of the waveguide and configured to adjust an angle of the light beam in an out-of-plane direction by adjusting an index of refraction of the liquid crystal material in the second region to establish the first out-of-plane angle at which the evanescently coupled portion of the light beam enters the out-coupling medium.

2. The planar waveguide of claim 1 further comprising:
   an in-coupling medium located to receive the light beam and evanescently couple the light beam to the waveguide core and the cladding in a third region of the waveguide.

3. The planar waveguide of claim 2 wherein a thickness of the cladding is tapered in the third region of the waveguide to evanescently couple the light beam to the waveguide core and the cladding.

4. The planar waveguide of claim 2 wherein an angle of the evanescently coupled light beam is determined by an inverse sine of an effective index of refraction of the waveguide core in the third region divided by the index of refraction of the in-coupling medium.

5. The planar waveguide of claim 2 wherein the in-coupling medium includes a facet oriented to refract the evanescently coupled light beam at a second out-of-plane angle when exiting the out-coupling medium.

6. The planar waveguide of claim 2 wherein a thickness of the cladding increases from a first thickness in the third region of the waveguide to a second thickness in the first region in an s-shaped taper to evanescently couple a Gaussian light beam to the waveguide core and the cladding in the third region.

7. The planar waveguide of claim 1, wherein the first electrode includes a patterned electrode sized and shaped to provide at least one refractive shape in the liquid crystal material to provide adjustment of the angle of the light beam in the in-plane direction.

8. The planar waveguide of claim 7, wherein the patterned electrode includes at least one interface non-normal to a direction of propagation of the light beam in the waveguide.

9. The planar waveguide of claim 1 wherein a thickness of the cladding decreases from a first thickness in the first region of the waveguide to a second thickness in the second region of the waveguide, the first thickness in the first region being selected to inhibit evanescent coupling between the waveguide core and the out-coupling medium, and the second thickness in the second region being selected to provide evanescent coupling between the waveguide core and the out-coupling medium.

10. A method for adjusting an angle of a light beam in two dimensions, the method comprising:
guiding the light beam along a length of a planar waveguide;
providing an interaction between an evanescent portion of the light beam and a liquid crystal material and confining the light beam within a waveguide core and a cladding in an out-of-plane direction in a first region of the planar waveguide;
receiving an evanescently out-coupled portion of the light beam at a first out-of-plane angle and a first in-plane angle from the waveguide core and the cladding in a second region of the planar waveguide;
adjusting an angle of the light beam in an in-plane direction by adjusting an index of refraction of the liquid crystal material in the first region to establish the first in-plane angle at which the evanescently out-coupled portion of the light beam enters an out-coupling medium; and
adjusting an angle of the light beam in an out-of-plane direction by adjusting an index of refraction of the liquid crystal material in the second region to establish the first out-of-plane angle at which the evanescently out-coupled portion of the light beam enters the out-coupling medium.

11. The method of claim 10 further comprising receiving the light beam and evanescently coupling the light beam from an in-coupling medium into the waveguide core and the cladding in a third region of the planar waveguide.

12. The method of claim 11 further comprising providing a tapered thickness of the cladding in the third region of the planar waveguide to evanescently in-couple the light beam into the waveguide core and the cladding.

13. The method of claim 11 further comprising determining an angle of the evanescently out-coupled light beam based on an inverse sine of an effective index of refraction of the waveguide core in the third region divided by the index of refraction of the in-coupling medium.

14. The method of claim 11 further comprising refracting the evanescently out-coupled light beam at a second out-of-plane angle when exiting the out-coupling medium.

15. The method of claim 11 further comprising providing an increased thickness of the cladding from a first thickness in the third region of the planar waveguide to a second thickness in the first region of the planar waveguide in an s-shaped taper to evanescently in-couple a Gaussian light beam into the waveguide core and the cladding in the third region of the planar waveguide.

16. The method of claim 10 further comprising providing a patterned first electrode to provide at least one refractive shape in the liquid crystal material to adjust the angle of the light beam in the in-plane direction.

17. The method of claim 16 further comprising providing at least one refractive shape in the liquid crystal material having at least one interface non-normal to a direction of propagation of the light beam in the planar waveguide.

18. The waveguide of claim 10 further comprising providing a decreased thickness of the cladding from a first thickness in the first region of the planar waveguide to a second thickness in the second region of the planar waveguide, the first thickness in the first region being selected to inhibit evanescent coupling between the waveguide core and the out-coupling medium, and the second thickness in the second region being selected to provide evanescent coupling between the waveguide core and the out-coupling medium.

19. A system for adjusting an angle of a light beam in two dimensions, the system comprising:
means for guiding the light beam along a length of a planar waveguide;
means for providing an interaction between an evanescent portion of the light beam and a liquid crystal material and confining the light beam within a waveguide core and a cladding in an out-of-plane direction in a first region of the planar waveguide;
means for receiving an evanescently out-coupled portion of the light beam at a first out-of-plane angle and a first in-plane angle from the waveguide core and the cladding in a second region of the planar waveguide;
means for adjusting an angle of the light beam in an in-plane direction by adjusting an index of refraction of the liquid crystal material in the first region to establish the first in-plane angle at which the evanescently out-coupled portion of the light beam enters an out-coupling medium; and
means for adjusting an angle of the light beam in an out-of-plane direction by adjusting an index of refraction of the liquid crystal material in the second region to establish the first out-of-plane angle at which the evanescently out-coupled portion of the light beam enters the out-coupling medium.

20. The system of claim 19 further comprising means for receiving the light beam and evanescently coupling the light beam from an in-coupling medium into the waveguide core and the cladding in a third region of the planar waveguide.

* * * * *